United States Patent
Beaulieu et al.

(10) Patent No.: US 9,430,929 B2
(45) Date of Patent: *Aug. 30, 2016

(54) PROVIDING A DIAGNOSIS OF A SYSTEM OF A BUILDING

(71) Applicant: Honeywell International Inc., Morristown, NJ (US)

(72) Inventors: Conrad B. Beaulieu, Duluth, MN (US); Wendy Foslien, Woodbury, MN (US); Henry Chen, Beijing (CN); Tom Plocher, Hugo, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/706,552

(22) Filed: May 7, 2015

(65) Prior Publication Data

US 2015/0243152 A1 Aug. 27, 2015

Related U.S. Application Data

(63) Continuation of application No. 13/589,815, filed on Aug. 20, 2012, now Pat. No. 9,070,174.

(51) Int. Cl.
*G08B 21/00* (2006.01)
*G08B 21/18* (2006.01)
(Continued)

(52) U.S. Cl.
CPC .............. *G08B 21/18* (2013.01); *G06Q 10/10* (2013.01); *G06Q 10/20* (2013.01); *G06Q 50/08* (2013.01);
(Continued)

(58) Field of Classification Search
CPC ........ G06Q 10/20; G06Q 10/10; H04Q 9/00; H04Q 1/28; H04L 12/282; H04L 12/2803; H04L 12/2816; H04L 12/2823; H04L 12/2807; H04L 12/2825; G05B 15/02; G05B 2219/2642; G06F 11/3058; F24F 11/006; F24F 2011/0091
USPC ......... 340/870.01, 870.09, 506, 286.04, 288, 340/292, 3.1; 700/275, 274, 277, 9, 28, 83; 715/736, 740, 771, 764; 702/183, 188
See application file for complete search history.

(56) References Cited

U.S. PATENT DOCUMENTS 8,001,070 B2 8/2011 Zhang et al.
2008/0306985 A1* 12/2008 Murray .................. G06Q 10/10
(Continued)

OTHER PUBLICATIONS

Artur Krukowski, et al. Comprehensive Building Information Management System Approach. International Journal of Simulation Systems, Science & Technology, vol. 11, No. 3, pp. 12-28, May 2010.
(Continued)

*Primary Examiner* — Mirza Alam
(74) *Attorney, Agent, or Firm* — Brooks, Cameron & Huebsch, PLLC

(57) ABSTRACT

Devices, methods, and systems for providing a diagnosis of a system of a building are described herein. One method includes displaying a system of a building, wherein the display of the system includes an identification of a particular component of the system, identifying, within the display of the system, a number of components of the system related to the particular component, and identifying, within the display of the system, a relationship between the particular component and the number of components and a relative operational status of the particular component and the number of components.

19 Claims, 5 Drawing Sheets

(51) Int. Cl.
 G06Q 10/10 (2012.01)
 H04L 12/28 (2006.01)
 G06Q 50/08 (2012.01)
 H04Q 9/00 (2006.01)
 G06Q 10/00 (2012.01)
(52) U.S. Cl.
 CPC .............. *H04L 12/282* (2013.01); *H04Q 9/00* (2013.01); *H04L 12/2803* (2013.01); *H04L 12/2825* (2013.01)

(56) References Cited

U.S. PATENT DOCUMENTS

| | | | |
|---|---|---|---|
| 2009/0210813 A1* | 8/2009 | Sawczak | G06F 1/206 715/771 |
| 2009/0307255 A1* | 12/2009 | Park | G06Q 10/10 |
| 2010/0235004 A1* | 9/2010 | Thind | G05B 15/02 700/277 |
| 2010/0249955 A1* | 9/2010 | Sitton | F24F 11/0034 700/33 |
| 2010/0318200 A1 | 12/2010 | Foslien et al. | |
| 2011/0057929 A1 | 3/2011 | Chen et al. | |
| 2011/0113360 A1* | 5/2011 | Johnson | H04L 12/2825 715/771 |
| 2012/0039503 A1 | 2/2012 | Chen et al. | |
| 2013/0085588 A1* | 4/2013 | Brun | G05B 15/02 700/97 |

OTHER PUBLICATIONS

Andreas Fernbach, et al. Interoperability at the Management Level of Building Automation Systems: A Case Study for BACnet and OPC UA, IEEE ETFA. pp. 1-8. 2011.

* cited by examiner

PROVIDING A DIAGNOSIS OF A SYSTEM
OF A BUILDING

CROSS-REFERENCE TO RELATED
APPLICATION

This application is a continuation of U.S. application Ser. No. 13/589,815, filed Aug. 20, 2012, the entire specification of which is incorporated herein by reference.

TECHNICAL FIELD

The present disclosure relates to devices, methods, and systems for providing a diagnosis of a system of a building.

BACKGROUND

An operations and/or domain analyst (e.g., a maintenance person) of a building may be responsible for diagnosing, fixing, and/or resolving problems (e.g., faults and/or abnormalities) associated with the building (e.g., associated with a system of the building). The analyst may also be responsible for diagnosing and/or improving poor performance (e.g., poor performance factors) of the building (e.g., of a system of the building).

In order to properly perform these tasks, however, the analyst has to have a sufficient understanding of the operational context of the building, and sufficient knowledge of which actions can be taken in response to the problem or poor performance. Accordingly, the analyst may need a significant amount of training and/or experience to properly perform these tasks. Further, performing these tasks may be time consuming for the operator.

DETAILED DESCRIPTION

Figure 1:
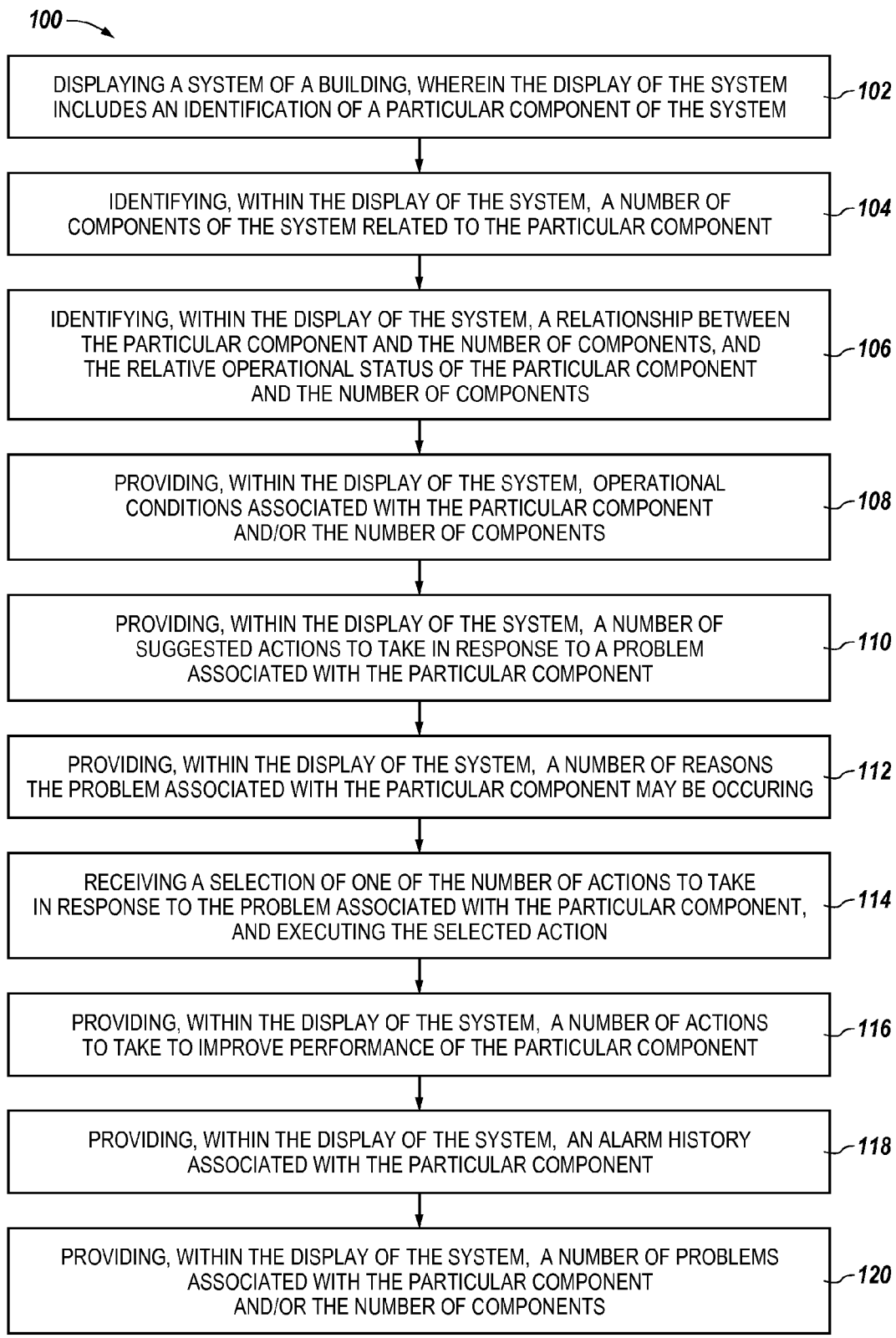
FIG. 1 illustrates a method for providing a diagnosis of a system of a building in accordance with one or more embodiments of the present disclosure.

Devices, methods, and systems for providing a diagnosis of a system of a building are described herein. For example, one or more embodiments include displaying a system of a building, wherein the display of the system includes an identification of a particular component of the system, identifying, within the display of the system, a number of components of the system related to the particular component, and identifying, within the display of the system, a relationship between the particular component and the number of components and a relative operational status of the particular component and the number of components.

Providing a diagnosis of a system of a building in accordance with one or more embodiments of the present disclosure can improve the ability of an operations and/or domain analyst (e.g., maintenance person) of the building to diagnose, fix, and/or resolve problems (e.g., faults and/or abnormalities) associated with the building system. Further, providing a diagnosis of a system of a building in accordance with one or more embodiments of the present disclosure can improve the ability of the building analyst to diagnose poor performance (e.g., poor performance factors) of the building system.

For example, one or more embodiments of the present disclosure can provide the analyst with information about a problem with and/or poor performance of the building system within the operational context of the building. Further, one or more embodiments of the present disclosure can provide the analyst with information about actions that can be taken in response to the problem and/or poor performance. Accordingly, one or more embodiments of the present disclosure can reduce the amount of training, experience, and/or time needed by the analyst to properly address the problem and/or poor performance of the building system.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of components" can refer to one or more components.

FIG. 1 illustrates a method 100 for providing a diagnosis (e.g., a visual diagnosis) of a system of a building in accordance with one or more embodiments of the present disclosure. Method 100 can be performed, for example, by computing device 340 described in connection with FIG. 3.

The diagnosis can be provided (e.g., displayed and/or presented), for example, to an operations and/or domain analyst of the building. However, embodiments of the present disclosure are not so limited. For example, the diagnosis can be provided to any person and/or entity responsible for diagnosing, fixing, and/or resolving problems (e.g., faults and/or abnormalities) associated with the building, and/or to any person and/or entity responsible for diagnosing and/or improving poor performance (e.g., poor performance factors) of the building.

At block 102, method 100 includes displaying (e.g., providing a display of) a system of a building, wherein the display of the system includes an identification of a particular component of the system. The system can be, for example, a control system of the building, such as a heating, ventilation, and air conditioning (HVAC) system of the building. However, embodiments of the present disclosure are not limited to a particular type of building system.

The display of the system can be, for example, an architectural layout of the system, such as, for instance, a floor plan and/or schematic of the system, and/or can include the components of the system (e.g., the particular component and other components of the system). The display of the system can be, for instance, a two-dimensional or three-dimensional display. However, embodiments of the present disclosure are not limited to a particular type of display.

The particular component can be, for example, an object, control component, piece of equipment, device, network, distribution system (e.g., an air, water, gas, electricity, and/or fuel distribution system), area, space, room, sensor, and/or actuator of the system. However, embodiments of the present disclosure are not limited to a particular type of component.

The identification of the particular component can include, for example, an illustration and/or highlighting of the particular component via, for example, color coding and/or animation, among other methods. That is, identification of the particular component can cause the particular component to stand out from and/or be contrasted with the rest of the display (e.g., the other components of the display). Further, the identification of the particular component can include hiding and/or adjusting (e.g., increasing) the transparency level of the other components of the system. Such an identification can avoid occlusion, for example.

In some embodiments, the particular component can be a component of the system having a problem associated therewith. The problem can be, for example, a fault, abnormality (e.g., abnormal performance characteristic), and/or error, such as a mechanical fault and/or control error, associated with the particular component. For instance, the problem can be that an operational condition (e.g., an operational and/or performance value) associated with the particular component that is not within a performance assessment rule and/or control chart for the particular component. As an example, the problem can be a temperature exception associated with the particular component (e.g., the temperature of the particular component is outside a particular temperature range).

In some embodiments, the display of the system can include an identification of the problem associated with the particular component. The identification of the problem associated with the particular component can include the operational status of the particular component and/or an indication that the particular component has a problem associated therewith such as, for example, an alarm associated with the particular component. An example of a display of a system of a building that includes an identification of a particular component of the system and a problem associated with the particular component will be further described herein (e.g., in connection with FIG. 2A).

In some embodiments, the particular component can be a component of the system selected (e.g., clicked on) in the display by a user. That is, the particular component can be identified in the display in response to a selection of the component by a user. The user can be, for example, the operations and/or domain analyst (e.g., maintenance person) of the building.

At block 104, method 100 includes identifying, within (e.g., in situ with and/or as part of) the display of the system, a number of components of the system related (e.g., operationally related) to the particular component. The number of components of the system related to the particular component can be identified within the display by, for example, illustrating and/or highlighting the number of components in the display (e.g., such that the number of components stand out from and/or are contrasted with the rest of the display).

The number of components of the system related to the particular component can include, for example, object(s), control component(s), equipment, device(s), network(s), distribution system(s), area(s), space(s), room(s), sensor(s), and/or actuator(s) of the system related to the particular component. For instance, the number of components can include a chiller(s), boiler(s), pump(s), fan(s), ducts, pipes, air damper(s) such as a variable air volume (VAV) damper, air handling unit(s) (AHUs), coil(s) such as a heating and/or cooling coil, air filter(s), and/or cooling tower(s). However, embodiments of the present disclosure are not limited to a particular type(s) of component.

A component of the system may be related to the particular component if, for example, its operation affects and/or controls the particular component (e.g., the operational condition associated with the particular component), or if it connects a particular component to other related components. For instance, if the particular component is a room of the building, components of the system of the building that may be related to the room can include, for example, an AHU (e.g., AHU 234 further described in connection with FIG. 2B) and/or a VAV (e.g., VAV 232 further described in connection with FIGS. 2B and 2C) damper that supplies air to the room, a cooling coil that transfers unwanted heat from the air of the room to a cooling tower, and the cooling tower that receives and disposes of (e.g., rejects) the unwanted heat via the cooling coil, among other possible components. An example of an identification within the display of a number of components of the system related to the particular component will be further described herein (e.g., in connection with FIGS. 2B-2C).

At block 106, method 100 includes identifying, within the display of the system, a relationship (e.g., an operational relationship) between the particular component and the number of components and the relative operational status of the particular component and the number of components. The relationship between the particular component and the number of components can be identified within the display by, for example, illustrating and/or highlighting the relationship. Further, a dynamic filter can be applied to select related and/or specific kinds of components at various levels of detail.

The relationship between the particular component and the number of components can include, for example, a number of connections between the particular component and the number of components (e.g., a chain of equipment, such as duct work, pipes, and/or electrical and/or gas distribution equipment, that connects the particular component and the number of components). An example of an identification within the display of a relationship between the particular component and the number of components will be further described herein (e.g., in connection with FIG. 2B).

At block 108, method 100 includes providing (e.g., displaying and/or presenting), within the display of the system, operational conditions (e.g., operational and/or performance values) associated with (e.g., of and/or at) the particular component and/or the number of components. Operational conditions associated with the particular component and/or the number of components can include, for example, temperature, air flow, humidity, air pollutants, liquid (e.g., water) flow, operational status and/or energy consumption. Further, the operational conditions can include the status of the particular component and/or an alarm(s) indicating a fault condition(s) associated with the particular component. However, embodiments of the present disclosure are not limited to a particular type(s) of operational conditions.

At block 110, method 100 includes providing, within the display of the system, a number of suggested actions to take in response to (e.g., to fix and/or resolve) a problem associated with the particular component. The problem associated with the particular component can be, for example, a fault, abnormality (e.g., abnormal performance characteristic), and/or error, such as a mechanical fault and/or control error, associated with the particular component, as previously described herein. Further, the problem can be related to the operational conditions associated with the particular component.

The number of actions to take in response to the problem associated with the particular component can be determined (e.g., by the computing device) based on, for example, rules (e.g., valid operating parameter ranges) associated with the particular component and/or the number of components, reasons the problem may be occurring, previous (e.g., previously occurring) operational conditions associated with the particular component and/or the number of components, and/or previous actions taken in response to previous problems associated with the particular component and/or the number of components. The number of actions to take can include, for example, requesting on-site and/or remote service support.

The number of actions to take can be provided, for example, in a text box within the display of the system and/or in a more hands-free mode, such as, for instance, a speech interface (e.g., artificial synthesized speech) and/or video clips explaining the possible root causes of the problem and/or action options. Further, the number of actions to take can be provided in order of probability that they will fix and/or resolve the problem associated with the particular component.

In some embodiments, the results of the action(s) taken in response to the problem can also be provided. For example, a comparison of the time line of the action(s) taken with co-incident factors that would be different such as, for instance, energy usage and/or cost, can be provided.

At block 112, method 100 includes providing, within the display of the system, a number of reasons the problem associated with the particular component may be occurring. The reasons the problem may be occurring can be provided, for example, in a text box within the display of the system (e.g., the same text box in which the number of actions to take in response to the problem are provided). Further the reasons can be provided in order of probability that they are the reason(s) the problem is occurring.

At block 114, method 100 includes receiving a selection of one of the number of actions to take in response to the problem associated with the particular component, and executing the selected action. The selection of the action to take in response to the problem can be received from a user, such as, for example, the operations and/or domain analyst of the building. That is, the user can select the action to take in response to the problem. However, embodiments of the present disclosure are not so limited. For example, in some embodiments, the action to take in response to the problem can be selected (e.g., automatically) by the computing device.

At block 116, method 100 includes providing, within the display of the system, a number of actions to take to improve performance of the particular component. For example, a number of actions that would increase the energy efficiency of the particular component can be provided.

The number of actions to take to improve the performance of the particular component can be determined (e.g., by the computing device) based on, for example, rules (e.g., operating parameters) associated with the particular component and/or the number of components, reasons the poor performance may be occurring, previous (e.g., previously occurring) operational conditions associated with the particular component and/or the number of components, and/or previous actions taken to improve the performance of the particular component. Further, a history of actions taken can be saved and later reviewed dynamically over a time line for selected components in order to help isolate recurring problems.

The number of actions to take can be provided, for example, in a text box within the display of the system (e.g., the same text box in which the number of actions to take in response to the problem associated with the particular component and/or the number of reasons the problem associated with the particular component may be occurring are provided). Additionally and/or alternatively, the number of actions to take can be provided in a hands-free mode via, for instance, a speech interface (e.g., synthesized speech) and/or video clips explaining the possible root causes of the problem and/or action options. Further, the number of actions to take can be provided in the order of probability that they will improve the performance of the particular component and/or in order of amount (e.g., by how much) they will improve the performance of the particular component in terms of energy consumption, cost, and/or environmental impact, among other factors.

Although not illustrated in FIG. 1, in some embodiments method 100 can include receiving (e.g., from a user) a selection of one of the number of actions to take in response to improve the performance of the particular component, and executing the selected action, in a manner analogous to that previously described in connection with block 114.

At block 118, method 100 includes providing, within the display of the system, an alarm history associated with the particular component. The alarm history can include, for example, previous problems associated with the particular component, and/or the dates and/or times the previous problems associated with the particular component occurred. The alarm history can be provided, for example, in a text box within the display of the system (e.g., the same text box in which the number of actions to take in response to the problem associated with the particular component, the number of reasons the problem associated with the particular component may be occurring, and/or the number of actions to take to improve the performance of the particular component are provided).

At block 120, method 100 includes providing, within the display of the system, a number of problems associated with the particular component and/or the number of components. The problems can be provided, for example, in a text box within the display of the system (e.g., the same text box in which the number of actions to take in response to the problem associated with the particular component, the number of reasons the problem associated with the particular component may be occurring, the number of actions to take to improve the performance of the particular component, and/or the alarm history are provided). Additionally and/or alternatively, the number of actions to take can be provided in a hands-free mode via, for instance, a speech interface (e.g., synthesized speech) and/or video clips explaining the possible root causes of the problem and/or action options.

The problems can be related to the operational conditions of the particular component and/or the number of components. For example, the problems associated with the number of components can be related to the operational conditions of the number of components. As an additional example, a problem can be a sub-class of an operational condition.

Although not shown in FIG. 1, in some embodiments method 100 can include receiving a selection of the particular component or one of the number of components, and providing, within the display of the system, additional information about the selected component. The component selection can be received from the user by, for example, the user clicking on the component in the display. The additional information can include, for example, the status history of the selected component, the maintenance history of the selected component, and/or specification information of the selected component, among other information.

Figure 2A:
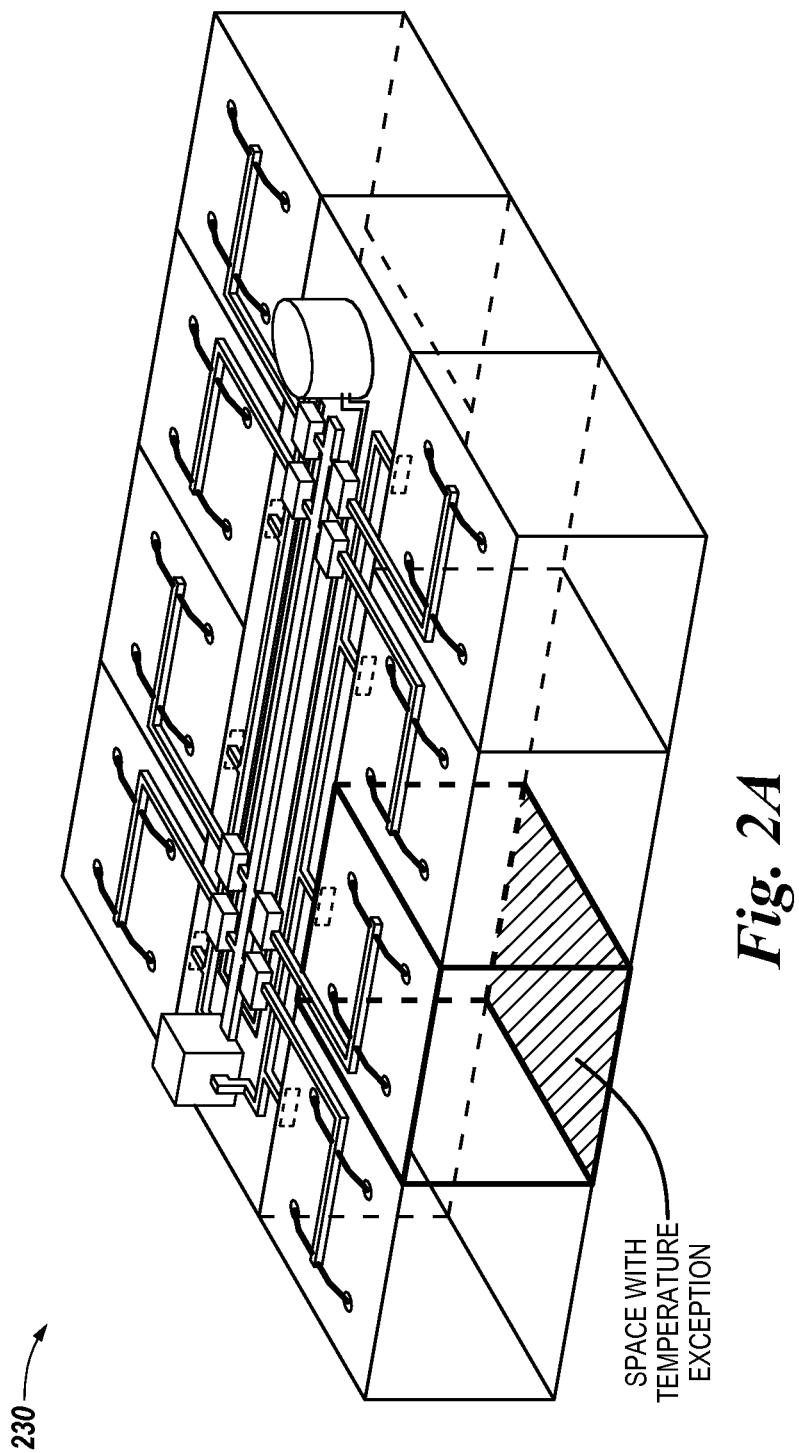
FIGS. 2A-2C illustrate an example of a display of a system of a building in accordance with one or more embodiments of the present disclosure.
Figure 2B:
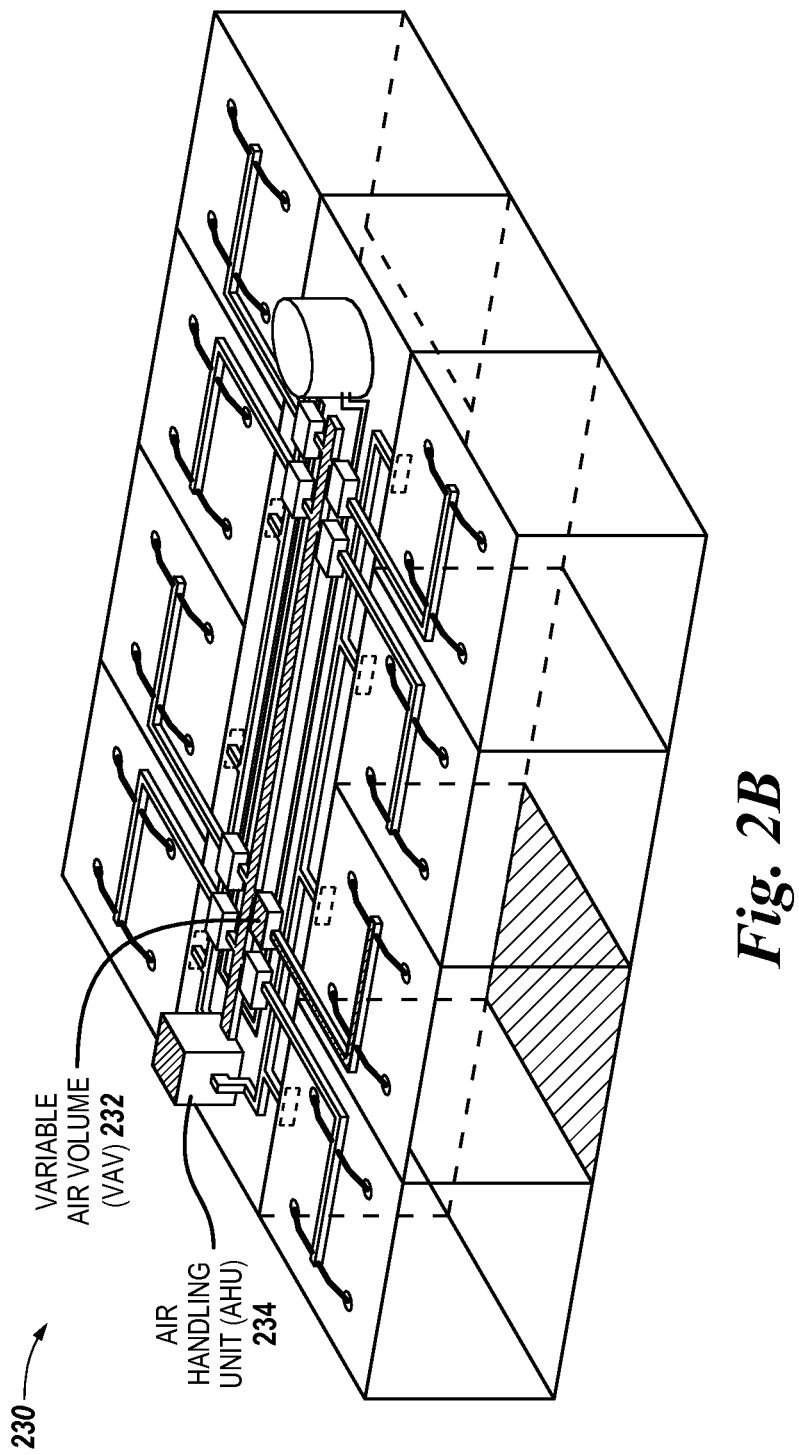
Figure 2C:
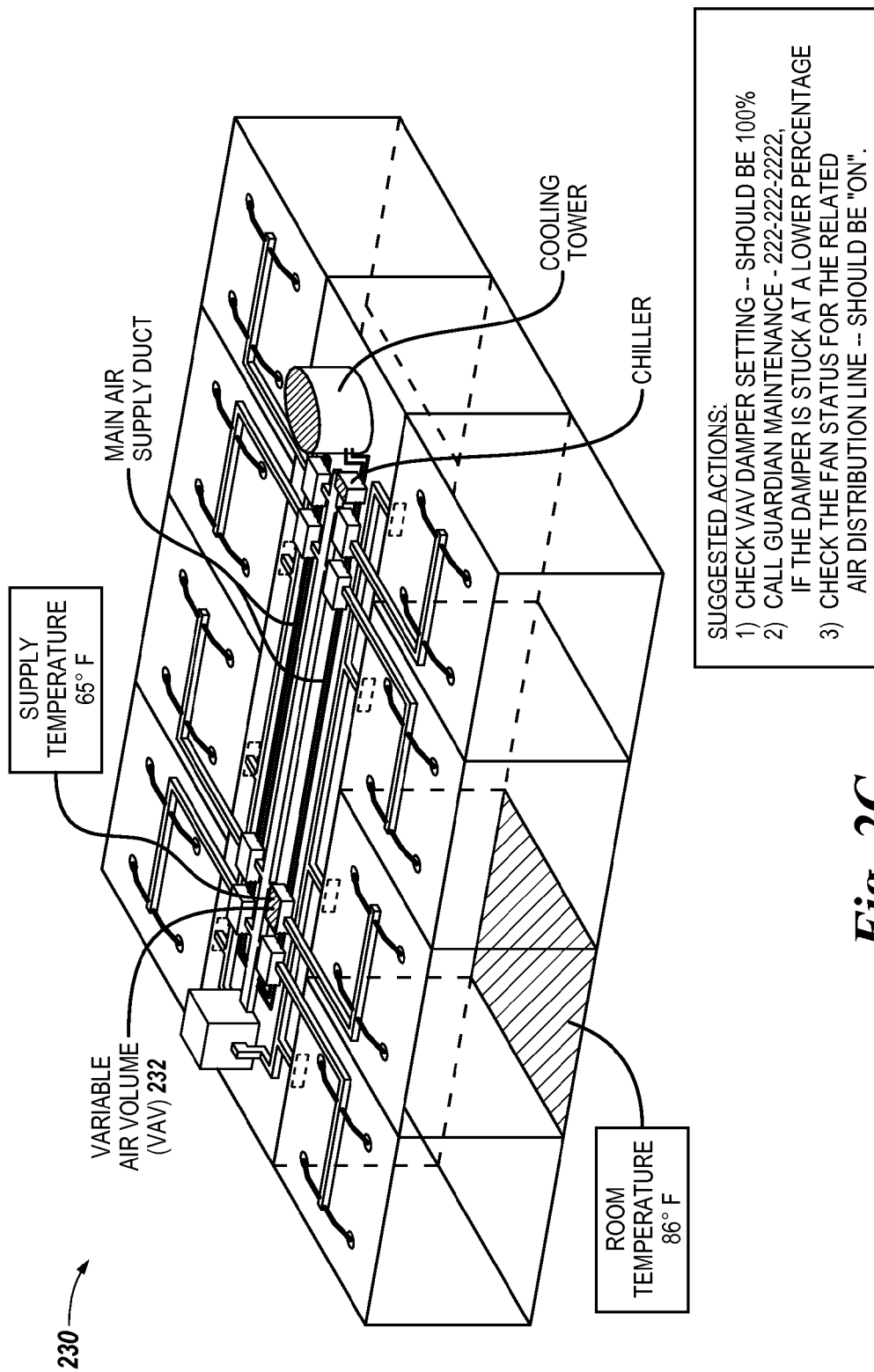

FIGS. 2A-2C illustrate an example of a display 230 of a system of a building in accordance with one or more embodiments of the present disclosure. Display 230 can be displayed by computing device 340 (e.g., user interface 346 of computing device 340) described in connection with FIG. 3. In the example illustrated in FIGS. 2A-2C, the system is an HVAC system of a building.

Display 230 can be displayed, for example, to an operations and/or domain analyst of the building. However, embodiments of the present disclosure are not so limited. For example, display 230 can be displayed to any person and/or entity responsible for diagnosing, fixing, and/or resolving problems (e.g., faults and/or abnormalities) associated with the building, and/or to any person and/or entity responsible for diagnosing and/or improving poor performance (e.g., poor performance factors) of the building.

In the example illustrated in FIG. 2A, display 230 includes an identification of a particular component of the system having a problem associated therewith, and an identification of the problem associated with the particular component. The particular component is a space (e.g., room) of the building, and the identification includes a highlighting of the space (e.g., the walls of the room). The problem associated with the identified space is a temperature exception (e.g., the temperature of the space is outside a particular temperature range). The identification of the temperature exception is an indication (e.g., a surface texture change) that there is a temperature exception associated with the space. That is, in the example illustrated in FIG. 2A, display 230 includes an identification of a space of the building having a temperature exception, and an identification of the temperature exception via a surface texture change.

In some embodiments, the shading and/or color of a surface texture change can be used to highlight various conditions of the particular component. The type of condition and/or how it is shown can be user selectable.

In the example illustrated in FIG. 2B, display 230 includes an identification within the display of a number of components of the system related to the space of the building identified in FIG. 2A, and an identification within the display of a relationship between the space and the number of components. The number of components of the system related to the space include an AHU 234 and a VAV 232 damper that supply air to the space, and the identification includes a highlighting of the AHU 234 and VAV 232 damper. The relationship between the space and the AHU 234 and VAV 232 damper includes the air ducts that connect the AHU 234 and VAV 232 damper with the space, and the identification includes a highlighting of the air ducts. That is, in the example illustrated in FIG. 2B, display 230 includes an identification within the display of an AHU 234 and VAV 232 damper that supply air to the space, and an identification with the display of the air ducts that connect the AHU 234 and VAV 232 damper with the space.

In the example illustrated in FIG. 2C, display 230 includes an identification within the display of an additional number of components of the system related to the space of the building identified in FIG. 2A. The number of components of the system related to the space include a chiller that transfers unwanted heat from the air of the space to a cooling tower, and the cooling tower that receives and disposes of (e.g., rejects) the unwanted heat from its cooling coil, and the identification includes a highlighting of the chiller and cooling tower. That is, in the example illustrated in FIG. 2C, display 230 includes an identification within the display of a chiller that transfers unwanted heat from the air of the space to a cooling tower, and the cooling tower that receives and disposes of the unwanted heat from the chiller.

In the example illustrated in FIG. 2C, display 230 also includes a text box providing the air supply temperature of VAV 232 damper, and a text box providing the temperature of the space. Further, in the example illustrated in FIG. 2C, display 230 includes a text box providing a number of suggested actions to take in response to the problem (e.g., the temperature exception) associated with the space.

Figure 3:
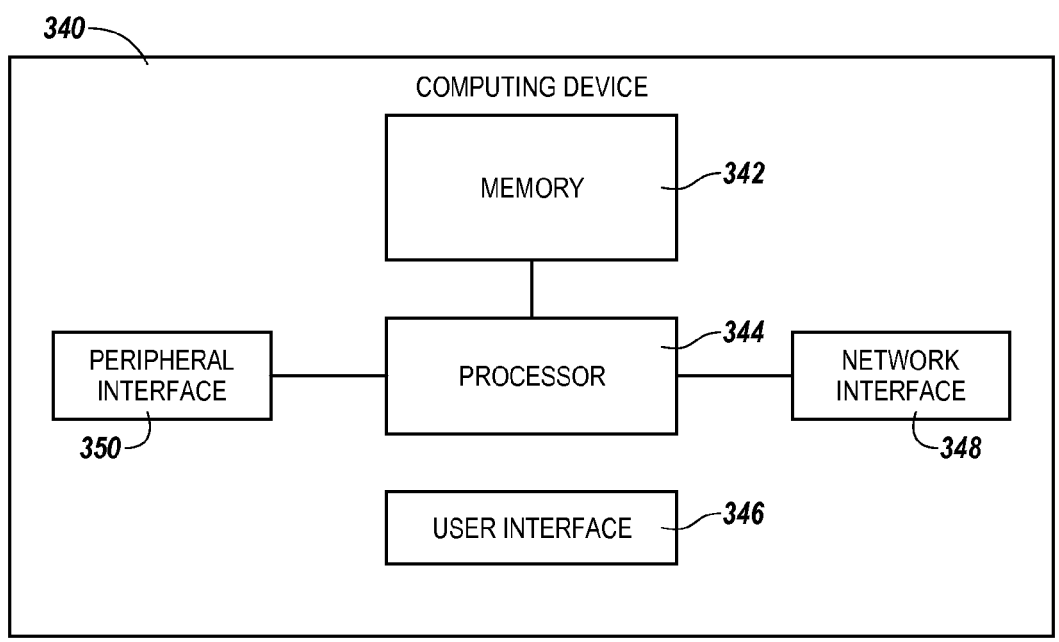
FIG. 3 illustrates a computing device for providing a diagnosis of a system of a building in accordance with one or more embodiments of the present disclosure.

FIG. 3 illustrates a computing device 340 for providing a diagnosis of a system of a building in accordance with one or more embodiments of the present disclosure. Computing device 340 can be, for example, a laptop computer, a desktop computer, or a mobile device (e.g., a mobile phone, a personal digital assistant, etc.), among other types of computing devices.

As shown in FIG. 3, computing device 340 can include a memory 342 and a processor 344 coupled to memory 342. Memory 342 can be any type of storage medium that can be accessed by processor 344 to perform various examples of the present disclosure. For example, memory 342 can be a non-transitory computer readable medium having computer readable instructions (e.g., computer program instructions) stored thereon that are executable by processor 344 to provide a diagnosis of a system of a building in accordance with one or more embodiments of the present disclosure.

Memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 342 is illustrated as being located in computing device 340, embodiments of the present disclosure are not so limited. For example, memory 342 can also be located internal to another computing resource (e.g., enabling computer readable instructions to be downloaded over the Internet or another wired or wireless connection).

As shown in FIG. 3, computing device 340 can also include a user interface 346. User interface 346 can include, for example, a display (e.g., a screen). The display can be, for instance, a touch-screen (e.g., the display can include touch-screen capabilities). Additionally and/or alternatively, user interface 346 can include a hand-free user interface in which actions and/or instructions can be provided (e.g., to a user of computing device 340) via a speech interface (e.g., synthesized speech), and in which the user can speak (e.g., rather than type) inputs into computing device 340, which can then recognize them.

User interface 346 (e.g., the display of user interface 346) can provide (e.g., display and/or present) information to a user of computing device 340. For example, user interface 336 can provide a display of a system of a building to the user, wherein the display includes an identification of a particular component of the system, an identification of a problem associated with the particular component, an identification of a number of components of the system related to the particular component, an identification of a relationship between the particular component and the number of components, operational conditions associated with the particular component and/or number of components, a number of actions to take in response to the problem associated with the particular component and/or to improve the performance of the particular component, a number of reasons the problem associated with the particular component may be occurring, an alarm history associated with the particular component, and/or a number of problems associated with the particular component and/or the number of components, as previously described herein.

The user of computing device 340 can be, for example, an operations and/or domain analyst of the building. However, embodiments of the present disclosure are not so limited. For example, the user can be any person and/or entity responsible for diagnosing, fixing, and/or resolving problems (e.g., faults and/or abnormalities) associated with the building, and/or to any person and/or entity responsible for diagnosing and/or improving poor performance (e.g., poor performance factors) of the building. Further, the user and computing device 340 may be co-located (e.g., the user and computing device may both be located in the building), or the user and computing device 340 may not be co-located (e.g., the user may remote into computing device 340 via a network).

Additionally, computing device 340 can receive information from the user of computing device 340 through an interaction with the user via user interface 346. For example, computing device 340 can receive input from the user, such as a selection of one of the number of actions to take in response to the program associated with the particular component, as previously described herein. The user can enter the input into computing device 340 using, for instance, a mouse and/or keyboard, or other peripheral, associated with computing device 340 (e.g., user interface 346), or by touching user interface 346 in embodiments in which user interface 346 includes a touch-screen.

As shown in FIG. 3, computing device 340 can also include a network interface 348 and a peripheral interface 350 coupled to processor 344. Network interface 348 can couple (e.g., connect) computing device 340 to one or more networks (not shown in FIG. 3), and peripheral interface 350 can couple computing device 340 to one or more peripheral devices. For example, peripheral interface 350 can include a voice, keyboard, mouse, video, and/or movement interpretation (e.g., WII) interface, among other types of peripheral interfaces.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for providing a diagnosis of a system of a building, comprising:
   displaying, by a computing device having a processor, a system of a building on a user interface of the computing device, wherein the display of the system includes an identification of a component of the system;
   identifying, by the computing device within the display of the system on the user interface, a number of other components of the system related to the component;
   identifying, by the computing device within the display of the system on the user interface:
      a relationship between the component and the number of other components; and
      a relative operational status of the component and the number of other components;
   providing, by the computing device within the display of the system on the user interface, a number of suggested actions to take in response to a problem associated with the component, wherein providing the number of suggested actions includes:
      determining a probability that respective suggested action will resolve the problem; and
      providing the number of suggested actions in an order of the probability that each respective suggested action will resolve the problem; and
   receiving, by the computing device from a user via the user interface, a selection of one of the number of suggested actions to take in response to the problem associated with the component.

2. The method of claim 1, wherein the method includes providing, within the display of the system, a result of the action selected to be taken in response to the problem associated with the component.

3. The method of claim 1, wherein the relationship between the component and the number of other components includes a number of connections between the component and the number of other components.

4. The method of claim 1, wherein the relative operational status of the component and the number of other components include operational conditions associated with the component and the number of other components.

5. The method of claim 4, wherein the operational conditions associated with the component and the number of other components include at least one of:
   temperature;
   air flow;
   humidity;
   air pollutants;
   liquid flow; and
   energy consumption.

6. The method of claim 1, wherein the identification of the component includes a highlighting of the component.

7. The method of claim 1, wherein identifying the number of other components includes highlighting the number of other components.

8. A computing device for providing a diagnosis of a system of a building, comprising:
   a user interface;
   a memory; and
   a processor configured to execute executable instructions stored in the memory to:
      provide, on the user interface of the computing device, a display of a system of a building, wherein the display of the system includes an identification of a component of the system;
      identify, within the display of the system on the user interface of the computing device, a number of other components of the system related to the component and a relationship between the component and the number of other components; and
      provide, within the display of the system on the user interface of the computing device:
         an operational condition associated with the component; and
         a number of suggested actions to take in response to a problem associated with the component, wherein providing the number of suggested actions includes:
            determining a probability that each respective suggested action will resolve the problem; and
            providing the number of suggested actions in an order of the probability that each respective suggested action will resolve the problem;
      receive, from a user via the user interface of the computing device, a selection of one of the number of suggested actions to take in response to the problem associated with the component; and
      provide, within the display of the system on the user interface of the computing device, a result of the action selected to be taken in response to the problem associated with the component.

9. The computing device of claim 8, wherein the display of the system includes an identification of the problem associated with the component.

10. The computing device of claim 8, wherein the operational condition associated with the component includes a temperature of the component.

11. The computing device of claim 8, wherein processor is configured to execute the executable instructions to provide the number of suggested actions to take in response to the problem associated with the component in a text box within the display of the system.

12. The computing device of claim 8, wherein processor is configured to execute the executable instructions to provide the number of suggested actions to take in response to the problem associated with the component in a hands-free mode.

13. A non-transitory computer readable medium having computer readable instructions stored thereon that are executable by a processor to:
   provide, by a computing device having a processor, a display of a system of a building on a user interface of the computing device, wherein the display of the system includes an identification of a component of the system and a problem associated with the component;
   identify, by the computing device within the display of the system on the user interface, a number of other components of the system related to the component and a relationship between the component and the number of other components;
   suggest, by the computing device within the display of the system on the user interface, a number of actions to take in response to the problem associated with the component, wherein suggesting the number of actions includes:
      determining a probability that each respective suggested action will resolve the problem; and
      suggesting the number of actions in an order of the probability that each respective suggested action will resolve the problem; and
   receive, by the computing device from a user via the user interface, a selection of one of the number of suggested actions to take in response to the problem associated with the component.

14. The non-transitory computer readable medium of claim 13, wherein the computer readable instructions are executable by the processor to:
   execute the selected action; and
   provide, within the display of the system, a result of the executed action.

15. The non-transitory computer readable medium of claim 13, wherein the relationship between the component and the number of other components includes a chain of equipment that connects the component and the number of other components.

16. The non-transitory computer readable medium of claim 13, wherein the computer readable instructions are executable by the processor to:
   determine a number of reasons the problem associated with the component is occurring; and
   suggest the number of actions to take in response to the problem based on the determined number of reasons the problem is occurring.

17. The non-transitory computer readable medium of claim 13, wherein the computer readable instructions are executable by the processor to suggest the number of actions to take in response to the problem associated with the component based on a number of previous operational conditions associated with the component.

18. The non-transitory computer readable medium of claim 13, wherein the computer readable instructions are executable by the processor to suggest the number of actions to take in response to the problem associated with the component based on a number of previous actions taken in response to a number of previous problems associated with the component.

19. The non-transitory computer readable medium of claim 13, wherein the number of actions include requesting service support.

* * * * *